United States Patent [19]

Suk

[11] 4,265,797

[45] May 5, 1981

[54] AEROSOL WATER-BASED PAINT COMPOSITION

[75] Inventor: Albert Suk, Richmond Hill, Canada

[73] Assignee: Conn Chem Group, Limited, Toronto, Canada

[21] Appl. No.: 97,152

[22] Filed: Nov. 26, 1979

Related U.S. Application Data

[63] Continuation-in-part of Ser. No. 968,277, Dec. 11, 1978, abandoned.

[51] Int. Cl.$^3$ ............................................... C08K 5/05
[52] U.S. Cl. ............................................... 260/29.6 E
[58] Field of Search ................... 260/29.6 E, 29.6 ME, 260/29.6 MH

[56] References Cited

U.S. PATENT DOCUMENTS

| | | | |
|---|---|---|---|
| 4,014,841 | 3/1977 | Taub | 260/29.6 ME |
| 4,133,790 | 1/1979 | Sekmakas | 260/29.6 E |

FOREIGN PATENT DOCUMENTS

54-23640  2/1979  Japan .

*Primary Examiner*—Paul R. Michl
*Attorney, Agent, or Firm*—Sim & McBurney

[57] ABSTRACT

An aerosol paint formulation capable of providing a high gloss pigmented finish comprises a propellant and a water-based concentrate which essentially contains water, a film-forming acrylic polymer and a lower monohydric alcohol.

5 Claims, No Drawings

AEROSOL WATER-BASED PAINT COMPOSITION

REFERENCE TO RELATED APPLICATION

This application is a continuation-in-part of copending U.S. patent application Ser. No. 968,277 filed Dec. 11, 1978, now abandoned.

FIELD OF INVENTION

The present invention is directed to aerosol paint compositions.

BACKGROUND TO THE INVENTION

Aerosol paint compositions are well known but these have used volatile organic solvents as the carrier for the film-forming polymer. Toxicity and flammability problems arise from the use of such organic solvents and governmental regulatory authorities are moving towards severe restrictions on the use of organic solvents in such compositions.

As far as the applicant is aware, attempts to provide a water-based aerosol paint formulation have been largely unsuccessful, owing to problems of foaming on spraying, inhibiting film formation, and stability in the can.

SUMMARY OF INVENTION

The present invention provides a non-foaming water-based aerosol paint composition which avoids the use of the prior art organic solvents and yet is capable of providing a high gloss finish. The composition, which is suitable for spray application to a substrate surface and air drying to a continuous film thereon, consists essentially of at least one liquified propellant and an active concentrate containing water, a lower non-toxic monohydric alcohol and an acrylic film-forming polymer. The composition has a pH of about 7.2 to about 10 to inhibit corrosion of the can in which it is packaged.

GENERAL DESCRIPTION OF INVENTION

The liquified propellant may be any convenient propellant or mixture of propellants having the desired vapor pressure to effect dispensing of the contents of the container in which the composition is packaged. Generally, the vapor pressure of the overall composition is in the range of about 30 to about 85 psig at 70° F., and preferably about 40 to about 60 psig.

The propellant may be one of the well-known fluorocarbon propellants, such as, Freon 12 and Freon 114. Since fluorocarbons have been associated with a theory concerning stratospheric ozone damage, it is preferred to use other chemically-stable, non-toxic materials, which are gaseous at room temperature and atmospheric pressure but liquid under aerosol can pressure.

The propellant should be one which does not react with any of the other components of the composition while in the aerosol container and which does not adversely affect the film-forming capability of the composition when sprayed on a substrate surface. Preferred propellants are hydrocarbons, such as, n-butane, isobutane, propane and ethane and water miscible propellants, such as, dimethyl ether.

The quantity of propellant used depends on the proportions of the other ingredients and its vapor pressure at atmospheric pressure and should be sufficient to effectively disperse all the contents of the container. Generally, the quantity of propellant used is about 10 to about 30% by weight of the composition, preferably about 25% by weight.

The remainder of the composition, generally comprising about 70 to about 90% by weight of the composition is made up of a water-based active film-forming composition, containing a film-forming polymer, water and a lower alcohol.

The film-forming polymer used in this invention is an acrylate polymer. Such polymer usually is used in formulating the composition in the form of an emulsion containing any convenient emulsifier. The film-forming polymer may be a water-insoluble interpolymer of (A) units from at least one neutral free-radical polymerizable ester having a vinylidene group attached to the functional group, which ester by itself yields a soft linear polymer, such as an acrylic, (B) units from at least one neutral polymerizable aromatic monovinylidene compound which by itself yields a hard polymer, especially, styrene, and (C) units from at least one neutral polymerizable aliphatic monovinylidene compound substituted by a cyano group and which by itself yields a hard polymer, especially acrylonitrile. Polymers of this type in emulsion form are available from Rohm and Haas Inc., under the designation "W.L. 91". Such polymers generally have a molecular weight of the order of 1 million.

The latter film-forming polymers are used since, in the emulsion form, they exhibit good tolerance to the incorporation of alcohols and the other components of the composition. Sufficient quantities of emulsion generally are used to provide a total solids content of the aerosol composition of about 8 to about 25% by weight and preferably about 15% by weight.

The carrier for the film-forming polymer comprises water and a water-soluble lower aliphatic monohydric alcohol. Both of these components are essential. The water provides the suspension phase for the polymer while the lower aliphatic alcohol provides a solvent for the propellant, so that proper intermixing of the propellant and the film-forming composition can occur.

The lower aliphatic monohydric alcohols used in this invention are those having the formula: R-OH wherein R is an unsubstituted straight or branched chain alkyl group containing from 1 to 4 carbon atoms. Examples of suitable monohydric alcohols are methanol, ethanol, n-propanol, isopropanol and n-butanol.

The quantity of lower aliphatic alcohol used in the aerosol composition generally is in the range of about 15 to about 35% by weight and the quantity of water used in aerosol compositions generally is in the range of about 10 to about 45% by weight.

In addition to the three essential components, namely, film-forming polymer, water and lower aliphatic monohydric alcohol, a number of minor components also may be present to impart beneficial properties to the composition.

One such optional component is a pigment for pigmentation of the film formed on spraying the composition onto a substrate surface. The pigment may be any convenient pigment useful for formation of pigmented films. When employed, up to about 15% by weight of the total composition of pigment may be used, preferably about 5 to about 15% by weight of pigment.

When such pigment is present, the quantity of polymer used is generally towards the lower end of the range recited above. When such pigment is omitted and a clear film is required, then quantities of polymer towards the higher end of the range are used.

The presence of the pigment usually requires the presence of added surfactant to ensure suspension of the pigment in the liquid vehicle. As noted above, some surfactant is present with the film-forming polymer, but the quantity involved usually is insufficient to effect suitable suspension of added pigment.

The overall quantity of surfactant present in the composition should be sufficient to maintain solids in suspension and usually varies up to about 3% by weight of the composition.

A coalescing solvent also may be used in the composition to assist in coalescence of the separate polymer particles into a uniform and continuous coating on the surface on which the composition is sprayed. The coalescing solvent may be any solvent soluble in water and which is also slow to evaporate. Suitable solvents include lower monoalkyl ethers of ethylene or propylene glycol, such as, propylene glycol methyl ether. When a coalescing solvent is present, it is used in quantities up to about 5% by weight of the total composition.

A pH stabilizer may also be present to provide an overall pH value greater than about 7.2 and up to about 10 to assist in inhibition of corrosion of the conventional aerosol metal container in which the composition usually is located. Suitable pH stabilizer materials include morpholine and ammonia. This component may be present in an amount of up to about 1% by weight of the total composition.

An anti-foam agent may be included to alter the surface tension of the composition to permit ready release of dissolved gases upon spraying of the composition onto the substrate surface and to counteract the detergent effect of surfactants present in the composition. A non-ionic blend of mineral oils and silica derivatives has been found to be suitable for use for defoaming. When an antifoam agent is present, quantities up to about 2% by weight of the total composition may be used, preferably about 1% by weight.

Another component which may be added is a plasticizer to promote flexibility. Any of a wide range of plasticizers may be used, for example, dioctyl phthalate. The plasticizer may be present in an amount of up to 2% by weight of the total composition, preferably about 1% by weight.

The aerosol composition provided in accordance with this invention is non-flammable, as tested according to standard flammability tests for aerosols. For example, the spray blows out a candle.

The composition is non-toxic since the only organic solvents present in large quantity are lower aliphatic monohydric alcohols and propellants. For example, isopropanol has a TLV of 400 ppm, ethanol has a TLV of 1000 ppm and butane and propane have TLV's of 500 ppm.

When the composition of this invention is sprayed on a substrate surface, foaming does not occur and the pigmented or unpigmented continuous film touch dries rapidly, usually in about 15 to 30 minutes, and exhibits complete water resistance in an acceptable period of time, usually in about 3 to 5 hours. Films having high gloss and excellent durability, including high flexibility retention and high gloss retention may be attained.

EXAMPLES

EXAMPLE 1

An aerosol formulation suitable for formation of a pigmented film, was made up, as follows, and packaged in an aerosol can:

| Component | % by weight |
|---|---|
| Propellant | 25.00 |
| W.L. 91 Emulsion[1] | 32.10 |
| Water | 16.24 |
| Isopropanol (98%) | 24.19 |
| Black pigment | 4.45 |
| Tamol 731[2] | 0.54 |
| Butyl Cellosolve (Trademark) | 4.92 |
| BYK 301[3] | 0.10 |
| L 475[4] | 0.26 |
| 5% Solution ammonia | 0.22 |
| Dibutyl phthalate | 0.98 |
| | 100.00 |

Notes:
[1] Rohm and Haas styrene-acn-acrylate emulsion containing about 58% water and about 5% surfactant
[2] Rohm and Haas surfactant
[3] Byk Mallinkrof silicone resin based levelling agent
[4] Dow Chemical antifoam agent This composition was sprayed onto a substrate surface. A coalesced black pigmented film rapidly formed and was dry to the touch after about 20 minutes. The film exhibited a high gloss and had water resistance after 3 hours, and had good resistance to strong organic solvents, including, gasoline and alcohols, after three days. The pigmented film exhibited resistance to external exposure over a one year test period.

EXAMPLE 2

An aerosol formulation, suitable for formation of a clear film, was made up as follows, and packaged in an aerosol can:

| Component | % by weight |
|---|---|
| Propellant | 25.00 |
| W.L.91 emulsion | 24.90 |
| Water | 18.00 |
| Isopropanol (18%) | 25.00 |
| Tamol 731 | 0.50 |
| Butyl Cellosolve | 5.00 |
| Byk 301 | 0.15 |
| L475 | 0.30 |
| 5% ammonia solution | 0.15 |
| Dioctyl phthalate | 1.00 |
| | 100.00 |

SUMMARY OF DISCLOSURE

In summary of this disclosure, the present invention provides a water-based aerosol composition capable of providing highly resistant pigmented or unpigmented high gloss films on substrate surfaces. Modifications are possible within the scope of the invention.

What I claim is:

1. An aerosol composition having a pH of about 7.2 to about 10 and suitable for spray application to a substrate surface and air drying to a continuous film thereon which has high gloss and excellent durability including high flexibility retention and high gloss retention, said composition consists essentially of:
   (a) about 10 to about 30% by weight of at least one propellant, (b) about 15 to about 35% by weight of at least one aliphatic monohydric alcohol of the formula: R-OH wherein R is an unsubstituted straight or branched chain alkyl group, and containing 1 to 4 carbon atoms, (c) about 10 to about 45% by weight of water, (d) about 8 to about 25% by weight of an insoluble film forming acrylic polymer in particulate form suspended in said composition, said acrylic polymer consisting of a water-insoluble interpolymer of (A) units from at least one neutral free-radical polymerizable ester having a vinylidene group attached to the functional group, which ester by itself yields a soft linear polymer, (B) units from at least one polymerizable aromatic monovinylidene compound which by itself yields a hard polymer, and (C) units from at least one neutral polymerizable aliphatic monovinylidene compound substituted by a cyano group and which by itself yields a hard polymer, (e) up to about 3% by weight of at least one surfactant present in an amount at least sufficient to maintain solids suspended in the liquid phase, (f) 0 to about 15% by weight of a pigment, (g) 0 to about 5% by weight of a coalescing solvent, (h) 0 to about 1% by weight of a pH stabilizer, (i) 0 to about 2% by weight of an antifoam agent, and (j) 0 to about 2% by weight of a plasticizer.

2. The composition of claim 1 wherein said film-forming polymer is a copolymer of styrene, acrylonitrile and an acrylate ester having a molecular weight of about 1 million, 3. The composition of claim 1 wherein said polymer is present in an amount of about 15% by weight.

4. The composition of claim 1 wherein said pigment is present in an amount of from about 5 to about 15% by weight.

5. The composition of claim 4 wherein said antifoam agent is present in an amount of about 1% by weight, said plasticizer is present in an amount of about 1% by weight.

* * * * *